(12) United States Patent
Du

(10) Patent No.: US 11,171,706 B2
(45) Date of Patent: Nov. 9, 2021

(54) METHOD FOR COORDINATING BEAM SWEEPING SCHEDULING AND INTELLIGENT CONTROLLER

(71) Applicant: Industrial Technology Research Institute, Hsinchu (TW)

(72) Inventor: Guan-Hsien Du, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 181 days.

(21) Appl. No.: 16/716,454

(22) Filed: Dec. 16, 2019

(65) Prior Publication Data
US 2021/0152229 A1 May 20, 2021

(30) Foreign Application Priority Data
Nov. 15, 2019 (TW) ................. 108141563

(51) Int. Cl.
*H04B 7/06* (2006.01)
*H04W 72/04* (2009.01)
(Continued)

(52) U.S. Cl.
CPC ......... *H04B 7/0695* (2013.01); *H04B 7/0617* (2013.01); *H04W 16/28* (2013.01); *H04W 72/046* (2013.01); *H04W 72/121* (2013.01)

(58) Field of Classification Search
CPC .. H04B 7/0695; H04B 7/0617; H04B 7/0639; H04B 7/088; H04B 7/043; H04W 16/28;
(Continued)

(56) References Cited

U.S. PATENT DOCUMENTS 10,172,071 B2 1/2019 Abedini et al.
2012/0071174 A1* 3/2012 Bao ................. H04W 4/024
455/456.3
(Continued)

FOREIGN PATENT DOCUMENTS

CN 108366376 8/2018
EP 3152970 4/2017
(Continued)

OTHER PUBLICATIONS

Tianyang Bai et al., "Analysis of beam sweep channel estimation in MmWave massive MIMO networks," 2016 IEEE Global Conference on Signal and Information Processing (GlobalSIP), Dec. 2016, pp. 615-619.
(Continued)

*Primary Examiner* — Mewale A Ambaye
(74) *Attorney, Agent, or Firm* — JCIPRNET

(57) ABSTRACT

The disclosure provides a method for coordinating beam sweeping scheduling and an intelligent controller. The method includes: controlling a first radio unit to perform a first beam sweeping operation to provide a plurality of first beams to a plurality of user equipments; determining whether or not a first specific beam corresponding to a hot spot area exists in the first beams; in response to determining the first specific beam exists in the plurality of first beams, obtaining a beam switching behavior associated with the first specific beam from radio units; obtaining a specific radio unit from the beam switching behavior; and controlling the specific radio unit to perform a second beam sweeping operation to provide at least one second specific beam directing to the hot spot area.

21 Claims, 7 Drawing Sheets

(51) Int. Cl.
*H04W 16/28* (2009.01)
*H04W 72/12* (2009.01)

(58) Field of Classification Search
CPC ... H04W 72/046; H04W 72/121; H04W 4/08; H04W 48/16; H04W 56/001; H04L 27/2673

See application file for complete search history.

(56) References Cited

U.S. PATENT DOCUMENTS

| | | | |
|---|---|---|---|
| 2013/0286960 A1 | 10/2013 | Li et al. | |
| 2016/0277087 A1 | 9/2016 | Jo et al. | |
| 2016/0323075 A1 | 11/2016 | Jeong et al. | |
| 2017/0346543 A1 | 11/2017 | Islam et al. | |
| 2018/0199310 A1* | 7/2018 | Islam | H04W 68/02 |
| 2018/0227886 A1 | 8/2018 | Chou et al. | |
| 2019/0116550 A1* | 4/2019 | Yang | H04W 48/16 |
| 2019/0223175 A1* | 7/2019 | Hakola | H04W 72/14 |
| 2019/0334604 A1* | 10/2019 | Kusano | H04B 7/088 |
| 2019/0380082 A1* | 12/2019 | Kim | H04W 36/0061 |

FOREIGN PATENT DOCUMENTS

| | | |
|---|---|---|
| EP | 3267594 | 1/2018 |
| JP | 2019509660 | 4/2019 |
| TW | 201711428 | 3/2017 |
| TW | I595762 | 8/2017 |
| TW | 201909671 | 3/2019 |
| WO | 2016210302 | 12/2016 |
| WO | 2017101062 | 6/2017 |
| WO | 2017180335 | 10/2017 |
| WO | 2017196246 | 11/2017 |
| WO | 2018134995 | 7/2018 |
| WO | 2018141981 | 8/2018 |
| WO | 2018155965 | 8/2018 |
| WO | 2019027679 | 2/2019 |
| WO | 2019074761 | 4/2019 |
| WO | 2019095783 | 5/2019 |
| WO | 2019202106 | 10/2019 |

OTHER PUBLICATIONS

Nicolo Michelusi et al., "Optimal Beam-Sweeping and Communication in Mobile Millimeter-Wave Networks," 2018 IEEE International Conference on Communications (ICC), May 2018 , pp. 1-6.

Jeng-Shin Sheu et al., "On the Design of Downlink Multiuser Transmission for a Beam-Group Division 5G System," IEEE Transactions on Vehicular Technology , vol. 67, Issue 8 , Aug. 2018, pp. 7191-7203.

Yen-Chih Kuo et al., "Latency-Optimal Beam Sweeping for Millimeter-Wave Communications," 2018 IEEE Globecom Workshops (GC Wkshps), Dec. 2018, pp. 1-7.

Marius Arvinte et al., "Beam Management in 5G NR using Geolocation Side Information," 2019 53rd Annual Conference on Information Sciences and Systems (CISS), Mar. 2019 , pp. 1-6.

Asim Mazin et al., "Accelerating Beam Sweeping in mmWave Standalone 5G New Radios Using Recurrent Neural Networks," 2018 IEEE 88th Vehicular Technology Conference (VTC-Fall), Aug. 2018, pp. 1-4.

Chung-Wei Weng et al., "Beam-Aware Dormant and Scheduling Mechanism for 5G Millimeter Wave Cellular Systems, " IEEE Transactions on Vehicular Technology, vol. 67, Issue 11, Nov. 2018, p. 10935-10949.

"Office Action of Taiwan Counterpart Application", dated Jul. 2, 2020, p. 1-p. 3.

"Office Action of Japan Counterpart Application", dated Mar. 2, 2021, p. 1-p. 2.

* cited by examiner

METHOD FOR COORDINATING BEAM SWEEPING SCHEDULING AND INTELLIGENT CONTROLLER

CROSS-REFERENCE TO RELATED APPLICATION

This application claims the priority benefits of Taiwan application serial no. 108141563, filed on Nov. 15, 2019. The entirety of each of the above-mentioned patent applications is hereby incorporated by reference herein and made a part of this specification.

TECHNICAL FIELD

The present disclosure relates to a method and an intelligent controller for coordinating beam sweeping scheduling.

BACKGROUND

As the mobile communication network evolved from 4G to 5G, the network architecture has also changed accordingly. For example, the eNodeB (eNB) role of the long term evolution (LTE) standard in the 5G architecture is divided into a centralized unit (CU) where the upper layer protocol is located, a distributed unit (DU) where the transport layer and the entity layer are located, and a radio unit (RU) that actually emits the signal at a front end. In addition, beamforming is adopted as a core technology on the radio access network (RAN). Although beamforming can reduce signal attenuation and improve signal quality by using high-directivity and energy-concentrated beams, it also concentrates on specific directions because of bit signals, which may cause problems with a small signal coverage.

For this problem, the 5G architecture uses a beam sweeping mechanism to solve. In this mechanism, the base station (or RU) periodically emits the signal beams that are wired and directed in different directions in a certain order. In this case, after various types of beams are measured by the user equipment (UE) located in the coverage of the base station, the signal quality of each beam is compared, and it is known what time a connection is performed and which beam of the base station is connected thereto.

However, since the network architecture and the connection mode of 5G are different from that of LTE, the way LTE used to solve the connection problem in the network may be unsuitable or ineffective.

Please refer to FIG. 1, which is a schematic diagram of a hot spot area. In FIG. 1, it is assumed that a RU 100 emits three beams 111, 112, 113 in different directions in a beam sweeping operation. In this case, the user equipment located in their respective coverages of the beams 111-113 can be respectively connected to their respective corresponding beams by detecting the beams 111-113 having higher signal strength. For example, a user equipment located within the coverage of beam 111 will be selected to connect to beam 111, a user equipment located within the coverage of beam 112 will be selected to connect to beam 112, and a user equipment located within the coverage of beam 113 will be selected to connect to beam 113.

However, as shown in FIG. 1, since a large number of user equipment are gathered in the coverage of the beam 112, such a coverage may be referred to as a hot spot. When this phenomenon occurs in the coverage of the RU 100, the load of the RU 100 may be excessively heavy, thereby reducing the transmission efficiency in the coverage area and even causing a disconnection. In general, the reason for the above hot spots is that a large number of user equipment simultaneously measure the best signal from the beam 112 of the RU 100, so an attempt is made to connect to the beam 112 of the RU 100.

Due to the different modes of operation of the network, the load balancing mechanism used in the LTE is difficult to function well in 5G networks. For example, in LTE, when the base station detects that there are too many user equipment connections and the connection quality is degraded, the handover parameters can be adjusted to make it easier for the user equipment in the coverage area to change connection to other base stations to reduce the load. However, in a 5G network, if multiple RUs belong to a same base station, no handover occurs, so it is impossible to change the handover parameter to change the terminal to connect to a specific beam. In addition, if multiple RUs belong to different base stations, changing the handover parameters may have a global impact. Moreover, in the case of using the beamforming technology, a single antenna will have a gain value of 3 to 5 dB in the direction indicated by the beam, and will have a multiple increase in a massive multiple input multiple output (MIMO) environment. Therefore, user equipment within the concentration direction will not easily meet the handover conditions.

In the LTE standard, the relevant functions of beam scheduling are located at a transport layer and a physical (PHY) layer, and the upper layer applications have no function/interface for controlling the underlying communication protocol. However, the O-RAN (Open RAN) Alliance established in recent years provides an open 5G RAN architecture that allows the upper layer applications to control the functions of DUs or CUs through the E2 interface.

Therefore, it is an important issue for a person skilled in the art to design a new load balancing mechanism suitable for a 5G network, so that the coordination and the control of beam scheduling for other RUs may become possible.

SUMMARY OF THE DISCLOSURE

Accordingly, the present disclosure provides a method and an intelligent controller for coordinating beam sweeping scheduling, which can be used to solve the above technical problem.

The present disclosure provides a method for coordinating beam sweeping scheduling, which is adapted to manage an intelligent controller of a plurality of radio units, the method comprising: controlling a first radio unit to perform a first beam sweeping operation to provide a plurality of first beams to a plurality of user equipments to connect to the first radio unit through one of the first beams; determining whether or not a first specific beam corresponding to a hot spot area exists in the first beams, wherein a plurality of first user equipments of the plurality of the user equipments are located in the hot spot area; in response to determining that the first specific beam exists in the first beams, and obtaining, from the plurality of radio units, a beam switching behavior associated with the first specific beam, wherein the first specific beam corresponds to one of a target beam and a source beam in the beam switching behavior; obtaining a specific radio unit from the beam switching behavior; controlling the specific radio unit to perform a second beam sweeping operation to provide a plurality of second beams, the second beams comprising at least one second specific beam directing to the hot spot area, thereby switching at least one of the first user equipments to the at least one second specific beam, wherein a directivity of each of the at least one second specific beam is higher than the directivity of each of the plurality of first beams.

The present disclosure provides an intelligent controller, which manages a plurality of radio units, comprising: a storage circuit, storing a plurality of modules; a processor, coupled to the storage circuit and accessing the plurality of modules to perform the following steps: controlling a first radio unit to perform a first beam scanning operation to provide a plurality of first beams to a plurality of user equipments to connect to the first radio unit through one of the plurality of first beams; determining whether or not a first specific beam corresponding to a hot spot area exists in the first beams, wherein a plurality of first user equipments of the plurality of the user equipments are located in the hot spot area; in response to determining that the first specific beam exists in the first beams, and obtaining, from the plurality of radio units, a beam switching behavior associated with the first specific beam, wherein the first specific beam corresponds to one of a target beam and a source beam in the beam switching behavior; obtaining a specific radio unit from the beam switching behavior; controlling the specific radio unit to perform a second beam sweeping operation to provide a plurality of second beams, the second beams comprising at least one second specific beam directing to the hot spot area, thereby switching at least one of the first user equipments to the at least one second specific beam, wherein a directivity of each of the at least one second specific beam is higher than the directivity of each of the plurality of first beams.

Based on the above, the method and the intelligent controller for coordinating beam sweeping scheduling disclosed by the present disclosure may find a specific RU near the hot spot area based on the relevant beam switching behavior of the first specific beam after determining that the first specific beam corresponding to the hot spot area occurs, and control the specific RU to emit a second specific beam with a higher directivity toward the hot spot area, thereby reducing the load of the first specific beam.

The foregoing will become better understood from a careful reading of a detailed description provided herein below with appropriate reference to the accompanying drawings.

DETAILED DESCRIPTION OF DISCLOSED EMBODIMENTS

According to the following embodiments, the present disclosure performs beam scanning operations on multiple RUs in the vicinity of a hot spot area through an E2 interface opened by an intelligent controller in a 5G architecture, to allow these RUs to emit beam signals to this hot spot area. So that, the user equipment in the hot spot area can have the opportunity to switch the beam and be connected to other RUs. This spreads the network load in the hot spot area.

Figure 1:
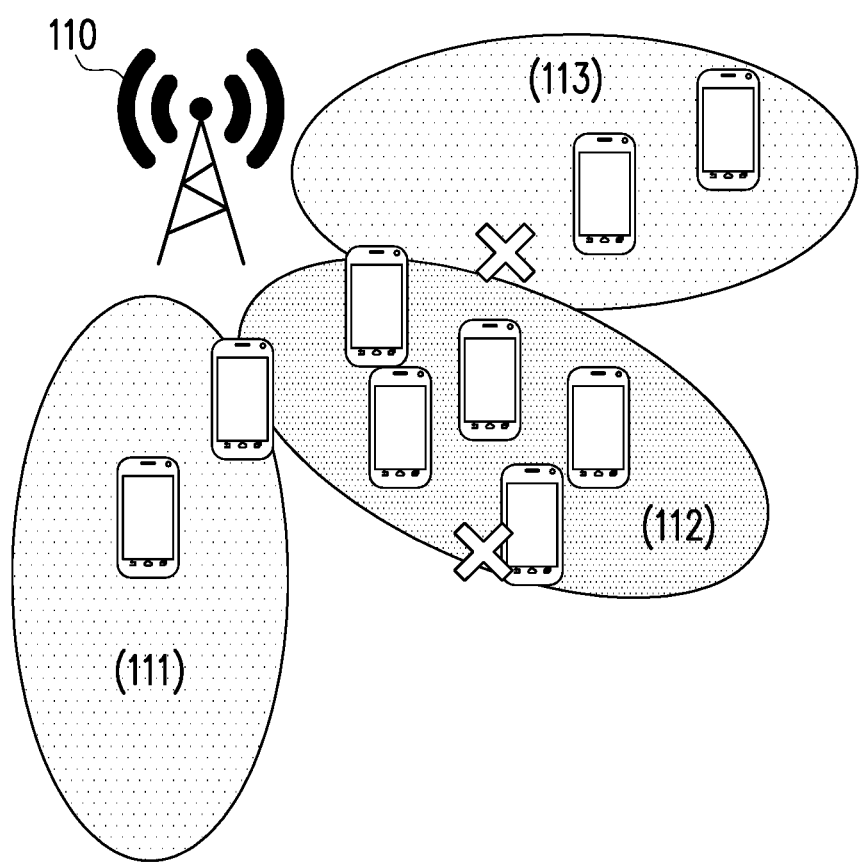
FIG. 1 is a schematic diagram of a hot spot area.
Figure 2:
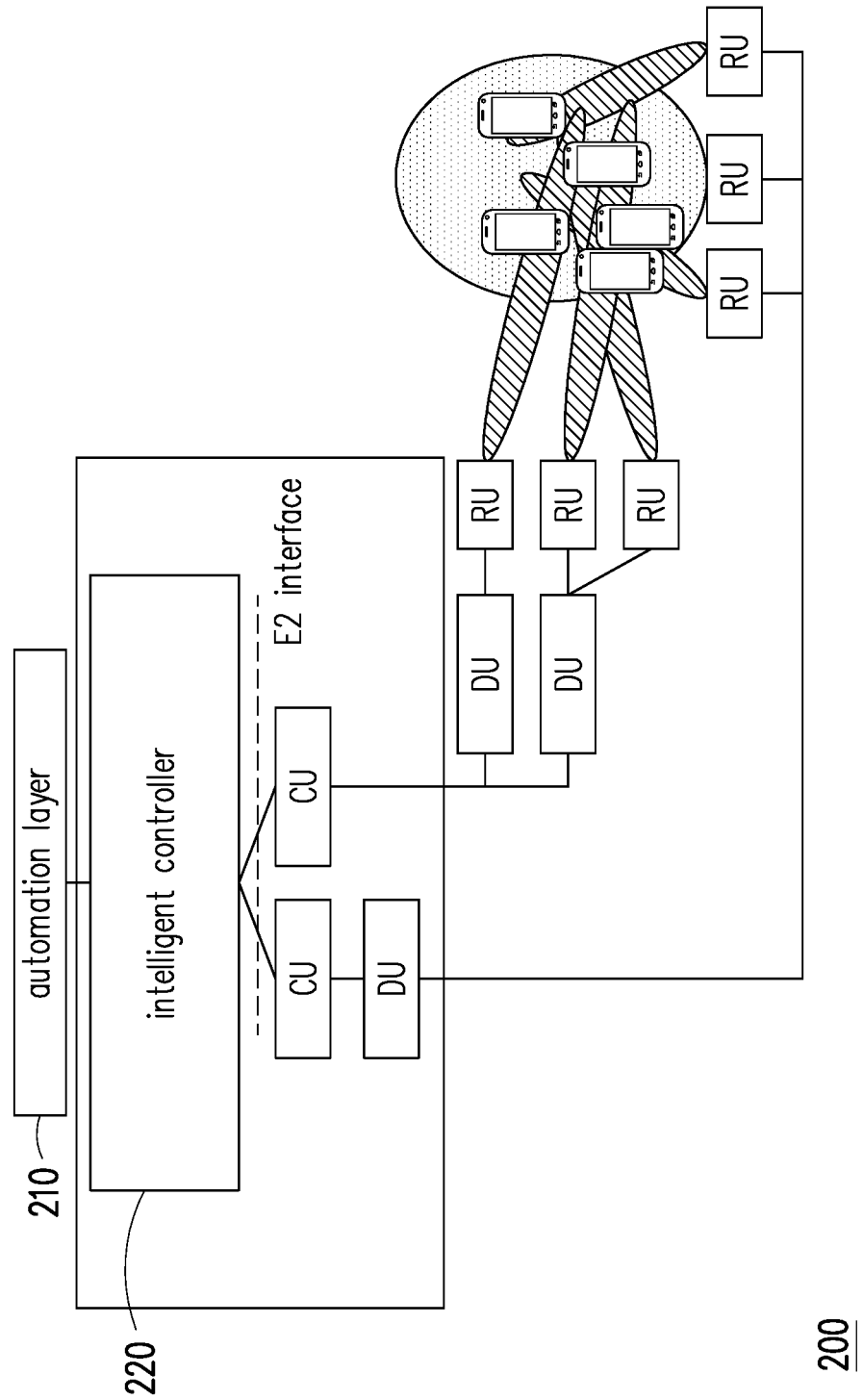
FIG. 2 is a schematic structural diagram of an O-RAN system according to an embodiment of the disclosure.

Please refer to FIG. 2, which is a schematic diagram of the architecture of an O-RAN system 200 according to an embodiment of the disclosure. As shown in FIG. 2, the O-RAN system 200 includes an automation layer 210, an intelligent controller 220, and a plurality of CUs, DUs, and RUs. In the embodiment of the disclosure, the automation layer 210 and the intelligent controller 220 are respectively, for example, an orchestration and automation layer and a RAN intelligent controller layer (RIC layer) in the O-RAN architecture. Moreover, the intelligent controller 220 can communicate with the media access control (MAC) and PHY related modules in the CU and the DU through the E2 interface to control the corresponding RU through the centralized unit (CU) and/or the decentralized unit (DU). For related details, refer to related technical documents of the O-RAN architecture, and details are not described herein.

Figure 3:
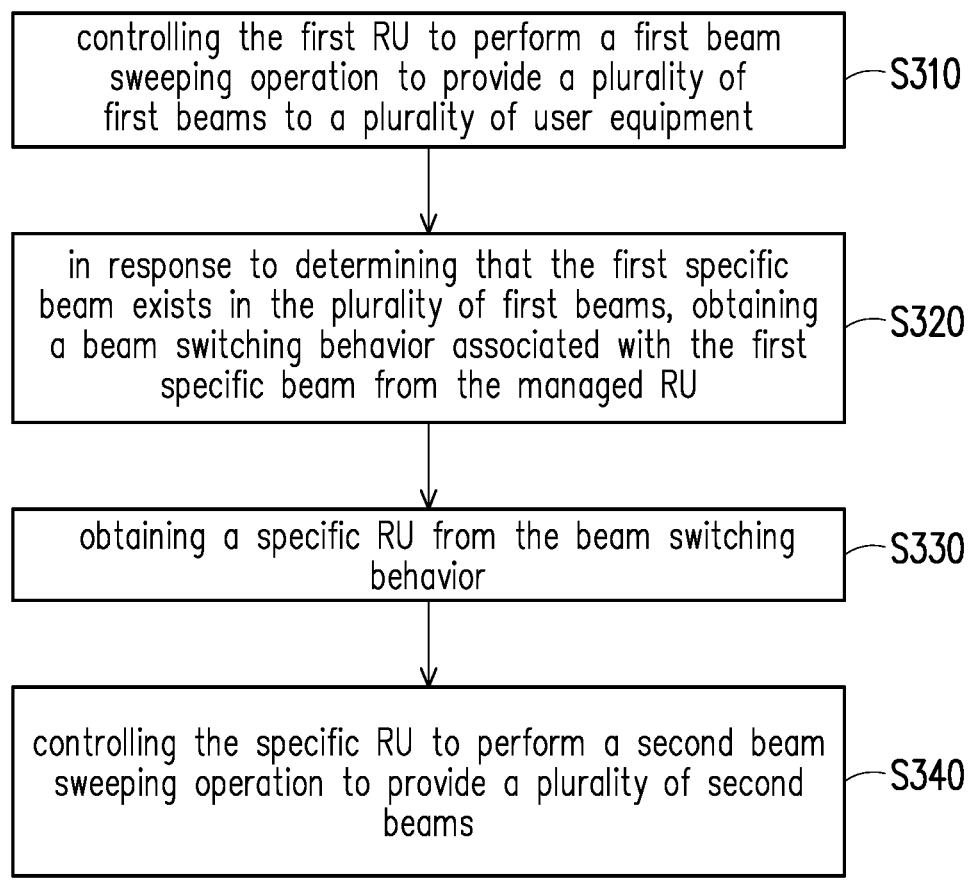
FIG. 3 is a flow chart of a method for coordinating beam sweeping scheduling according to an embodiment of the disclosure.

In an embodiment of the present disclosure, the intelligent controller 220 can be configured to perform the method of coordinating beam sweeping scheduling disclosed in the present disclosure. Please refer to FIG. 3, which is a flowchart of a method for coordinating beam sweeping scheduling according to an embodiment of the disclosure. The method of the present embodiment can be performed by the intelligent controller 220 in FIG. 2, and the details of the steps S310 to S340 in FIG. 3 will be described below with reference to the contents in FIG. 2 and the application scenarios of FIGS. 4A to 4C.

First, in step S310, the intelligent controller 220 may control the first RU 410 to perform a first beam sweeping operation to provide a plurality of first beams B1, B2, and B3 to a plurality of user equipment UD, wherein each user equipment UD can be connected to the first RU 410 through one of the aforementioned first beams B1 B2, and B3.

In an embodiment, the intelligent controller 220 can simultaneously manage multiple RUs (for example, the first RU 410, the second RU 420, and the third RU 430), and each RU can transmit its connection status through the corresponding CU/DU. The connection status is reported to the intelligent controller 220. In various embodiments, the above connection status include, for example, the number of connected users of each beam. Taking the situation of FIG. 4A as an example, the first RU 410 can report the number of connected users of the first beams B1, B2, and B3 to the intelligent controller 220 through the corresponding CU/DU, respectively. For example, the number of connected users of the first beams B1, B2, and B3 may be, but not limited to 2, 5, and 2, respectively.

Based on the information reported by the RUs, the intelligent controller 220 can determine whether or not there is a first specific beam corresponding to the hot spot area, wherein the first specific beam is one of the beams emitted by the RUs, that is, the first specific beam is connected with a large number of user equipment in the coverage area. Taking the first RU 410 as an example, the intelligent controller 220 can obtain the number of connected users of the first beams B1~B3 (2, 5, 2 respectively). Then, the intelligent controller 220 can determine whether or not the number of connected users of any one of the first beams B1~B3 is greater than a predetermined threshold. In an embodiment, the predetermined threshold may be based on a total number of user equipment UDs (indicated by T) and a predetermined ratio. Assuming that the predetermined threshold is P, the predetermined threshold can be set, for example, to T×P. That is, the intelligent controller 220 can determine whether or not the user equipment exceeding the predetermined ratio in the user equipment UD is connected to a certain one of the first beams B1~B3. If so, the intelligent controller 220 can treat the beam as the first specific beam, and the coverage of the first specific beam can be regarded as the hot spot area.

Figure 4A:
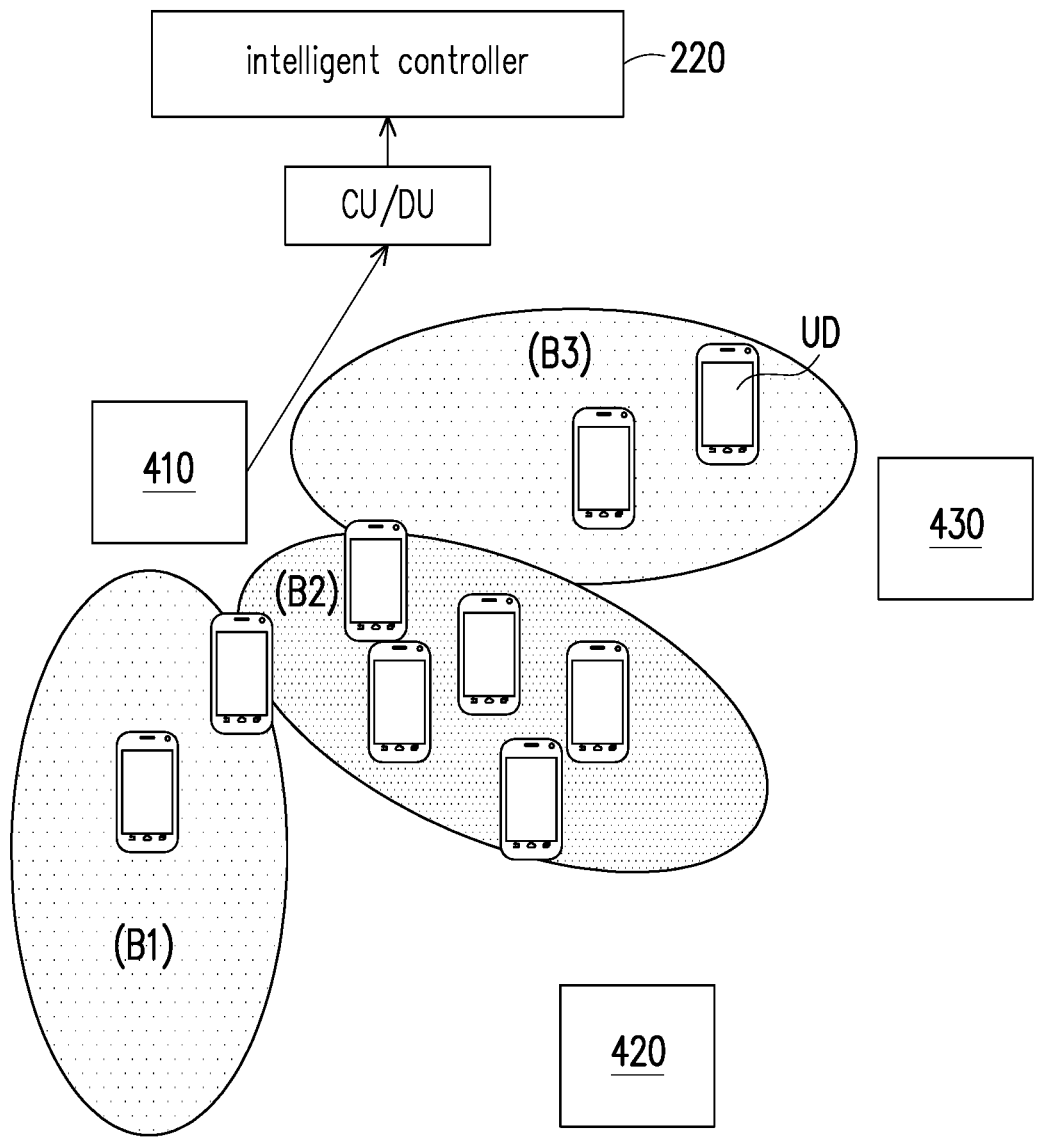
FIG. 4A-4C are application scenarios according to an embodiment of the disclosure.

In the situation of FIG. 4A, if the number of connected users of the first beam B2 (that is, 5) is greater than the predetermined threshold, the intelligent controller 220 may determine that the first beam B2 is corresponding to the hot spot area, but is not limited thereto.

Next, in step S320, in response to determining that there is a first specific beam (that is, the first beam B2) in the first beams B1~B3, the intelligent controller 220 may obtain the a beam switching behavior associated with the first specific beam from the managed RU, wherein the first specific beam corresponds to one of the target beam and the source beam in the beam switching behavior. Thereafter, in step S330, the intelligent controller 220 may acquire a specific RU corresponding to another of the target beam and the source beam.

Figure 4B:
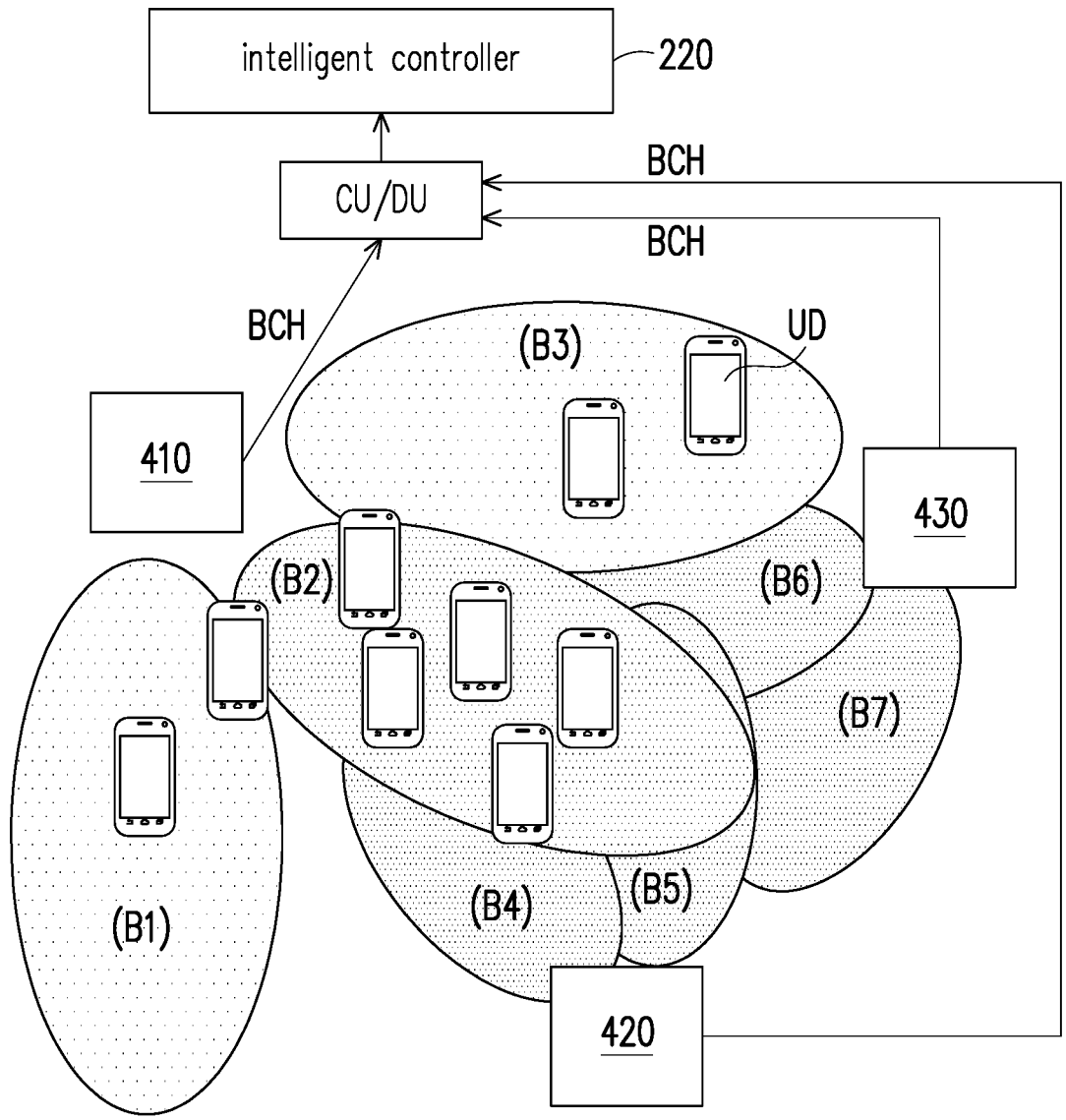

Specifically, as shown in FIG. 4B, since the RU managed by the intelligent controller 220 is, for example, the first RU 410, the second RU 420, and the third RU 430, the intelligent controller 220 can receive the beam switching behavior BCH associated with the first beam B2 from the first RU 410, the second RU 420 and the third RU 430.

In the embodiment of the present disclosure, a primary beam switching behavior can be understood as a connection switching data of a user equipment switching from a originally connected beam (hereinafter referred to as a source beam) to another beam (hereinafter referred to as a target beam). Accordingly, the beam switching behavior BCH associated with the first beam B2 can be understood as the first beam B2 corresponding to one of the source beam and the target beam. That is, in the primary beam switching behavior BCH associated with the first beam B2, there is one user equipment that switches from the first beam B2 to another beam, or switches from another beam to the first beam B2.

In an embodiment, the respective beam switching behaviors BCH associated with the first beam B2 may be exemplified as the contents of Table 1 below.

| Number (No.) | beam switching behavior |
|---|---|
| 1 | B2(410) -> B5(420) |
| 2 | B2(410) -> B5(420) |
| 3 | B4(420) -> B2(410) |
| 4 | B7(430) -> B2(410) |
| 5 | B2(410) -> B6(430) |

As can be seen from the scenario illustrated in Table 1, in the beam switching behavior of No. 1 and 2, the first beam B2 corresponds to the source beam, and the beam B5 provided by the second RU 420 corresponds to the target beam. That is, there has been a user equipment switching from the first beam B2 to the beam B5. Thus, based on the beam switching behavior of No. 1 and 2, the intelligent controller 220 can treat the second RU 420 corresponding to the beam B5 as the specific RU referred to as step S330.

Similarly, in the beam switching behavior of No. 5, the first beam B2 corresponds to the source beam, and the beam B6 provided by the third RU 430 corresponds to the target beam. That is, there has been a user equipment switching from the first beam B2 to the beam B6. Thus, based on the beam switching behavior of No. 5, the intelligent controller 220 can regard the third RU 430 corresponding to the beam B6 as a specific RU referred to as step S330.

Furthermore, in the beam switching behavior of No. 3, the first beam B2 corresponds to the target beam, and the beam B4 provided by the second RU 420 corresponds to the source beam. That is, there has been a user equipment switching from the beam B4 to the first beam B2. Thus, based on the beam switching behavior of No. 3, the intelligent controller 220 can regard the second RU 420 as the specific RU referred to as step S330.

Similarly, in the beam switching behavior of No. 4, the first beam B2 corresponds to the target beam, and the beam B7 provided by the third RU 430 corresponds to the source beam. That is, there has been a user equipment switching from the beam B7 to the first beam B2. Thus, based on the beam switching behavior of No. 4, the intelligent controller 220 can regard the third RU 430 as the specific RU referred to as step S330.

It can be understood from the teachings of the previous embodiments that if a user equipment has been switched from A beam to B beam, it means that the geographic locations of the RUs providing the A and B beams may be similar to each other. Therefore, based on the content of Table 1, the intelligent controller 220 can know that the second RU 420 and the third RU 430 are likely to be located near the hot spot area, and each of the second RU 420 and the third RU 430 can be selected as the specific RU for providing assistance to hot spot area.

Accordingly, in step S340, the intelligent controller 220 may control the specific RU to perform a second beam sweeping operation to provide a plurality of second beams including at least one second specific beam directed to the hot spot area. In this embodiment, the beam sweeping scheduling of the second beam sweeping operation associated with the beam switching behavior is different from the beam sweeping scheduling of the first beam sweeping operation.

In the above embodiment, since the second RU 420 and the third RU 430 are selected specific RUs, the intelligent controller 220 can control the second RU 420 and the third RU 430 to perform the second beam sweeping operation through the corresponding DU/CU, so as to provide a plurality of a second beam comprising at least one second specific beam directed to the hot spot area, wherein the directivity of each of the at least one second specific beam is higher than the directivity of each of the first beams B1, B2, B3. In an embodiment, the energy of each of the at least one second specific beams is higher than the energy of each of the first beams B1, B2, B3. In another embodiment, the bandwidth of each of the at least one second specific beams is narrower than the bandwidth of each of the first beams B1, B2, B3, but is not limited thereto.

Figure 4C:
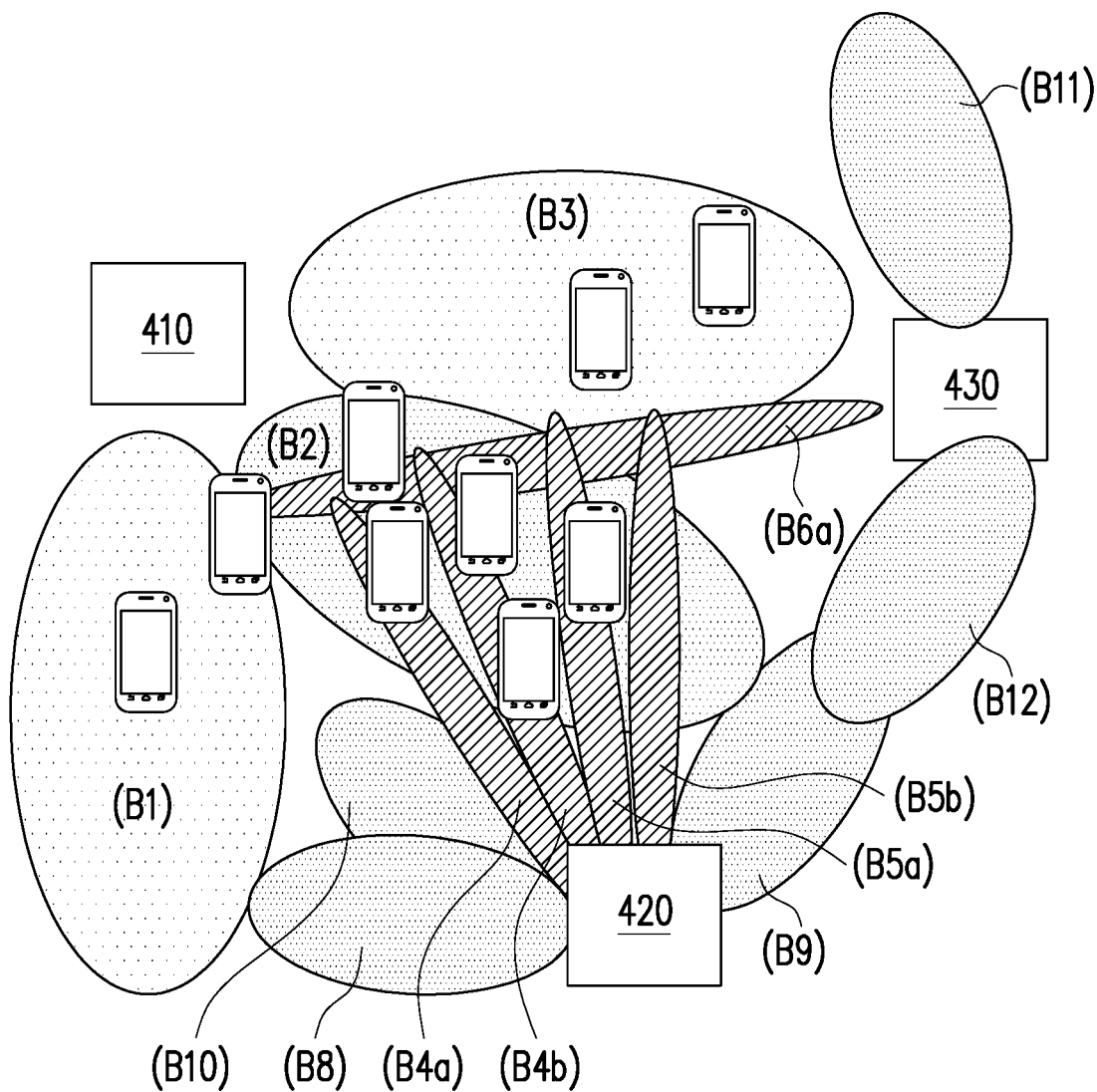

As shown in FIG. 4C, after performing the second beam sweeping operation, the second RU 420 may provide second beams B4, B4a, B4b, B5a, B8, B9, and B10, wherein the second beams B4a, B4b, and B5a are, for example, a second specific beams directed to the hot spot area. Also, the direction of the second beams B4a and B4b may correspond to the beam B4, and the direction of the second beams B5a and B5b may correspond to the beam B5. In addition, after performing the second beam sweeping operation, the third RU 430 may provide the second beam B6a, B11, and B12, wherein the second beam B6a is, for example, a second specific beam directed to the hot spot area, and the direction of the second beam B6a may correspond to beam B6.

Moreover, since the energy of each of the second beams B4a, B4b, B5a, B5b, and B6a is higher than that of each of the first beams B1, B2, and B3, the user equipment; in the hot spot area (corresponding to the coverage of the first specific beam) will have a higher chance of switching and connecting to one of the second beams B4a, B4b, B5a, B5b and B6a. That is, the method of the present disclosure may distribute the load of the first specific beam (for example, the first beam B2) corresponding to the hot spot area to the second specific beam, thereby reducing the load of the first specific beam to achieve load balancing.

In an embodiment, even if the intelligent controller 220 determines that a hot spot area occurs, it may only mean that there are more user equipment in the hot spot area, and does not represent a situation in which the first specific beam corresponding to the hot spot area will be overloaded. Thus, in an embodiment, the intelligent controller 220 can further determine whether or not the specific beam has been overloaded based on the associated indicator of connection quality of the first specific beam.

Specifically, in an embodiment, each RU may also report various indicators of connection quality of the emitted beam (for example, dropped call rate, connection establishment number, connection success number) to the intelligent controller 220. In this case, after the intelligent controller 220 determines that the first specific beam corresponding to the hot spot area (for example, the first beam B2) appears, it may also determine whether or not the first specific beam has been overload based on the indicator of connection quality of the first specific beam. In different embodiments, the intelligent controller 220 can determine, for example, whether or not the call drop rate of the first specific beam is higher than the first threshold, whether or not the connection establishment number is higher than the second threshold, and/or whether or not the connection success number is lower than the third threshold to determine whether or not the first specific beam is overloaded, but is not limited thereto. The first, second and third thresholds can be set by the designer according to experiences and needs.

In response to determining that the first specific beam has been overloaded, the intelligent controller 220 can again obtain associations from the managed RUs (for example, the first RU 410, the second RU 420, and the third RU 430) in accordance with the teachings of the previous embodiments to obtain the beam switching behavior of the first specific beam (step S320), and then steps S330 and S340 are performed to provide assistance to the first specific beam.

On the other hand, if the first specific beam is not overloaded, that is, the first specific beam may not need assistance, the intelligent controller 220 may ignore the first specific beam accordingly. That is, the intelligent controller 220 may not perform steps S320 to S340 as mentioned in the previous embodiment, but may not be limited thereto.

Figure 5:
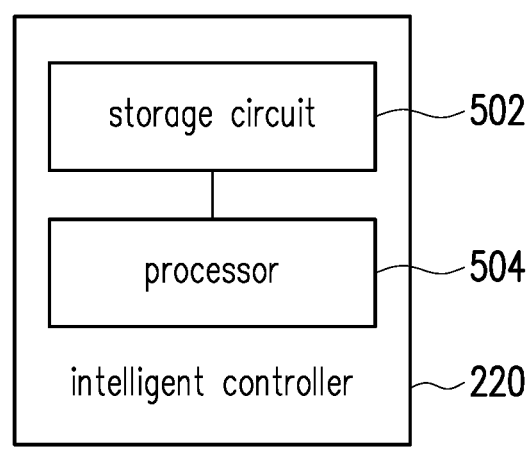
FIG. 5 is a schematic diagram of an intelligent controller according to an embodiment of the disclosure.

Please refer to FIG. 5, which is a schematic diagram of an intelligent controller according to an embodiment of the disclosure. In this embodiment, the intelligent controller 220 can include a storage circuit 502 and a processor 504.

The storage circuit 502 is, for example, any type of fixed or removable random access memory (RAM), read-only memory (ROM), flash memory), a hard disk or other similar devices or a combination of these devices, which can be used to record multiple codes or modules.

The processor 504 is coupled to the storage circuit 502 and can be a general purpose processor, a special purpose processor, a conventional processor, a digital signal processor, a plurality of microprocessors, integration of one or more digital signal processor cores, a controller, a microcontroller, Application Specific Integrated Circuit (ASIC), a Field Programmable Gate Array (FPGA), any other kind of IC, state machines, processors based on Advanced RISC Machine (ARM), and the like.

In the embodiment of FIG. 5 of the present disclosure, the processor 504 can access the modules and the codes recorded in the storage circuit 502 to implement the coordinated beam scanning scheduling proposed by the present disclosure. For details, refer to the previous embodiment. The description in this article will not be repeated here.

In summary, the method and the intelligent controller of the coordinated beam sweeping scheduling disclosed by the disclosure may find a specific RU located near the hot spot area based on the relevant beam switching behavior of the first specific beam after determining that the first specific beam corresponding to the hot spot area appears on the first RU. Afterwards, the intelligent controller can perform a beam sweeping operation by controlling the specific RU through the corresponding CU/DU, and change the beam sweeping operation originally set by the specific RU, so that the second beam emitted by the specific RU toward the hot spot area includes the second specific beam with higher directivity. Thereby, the user equipment located in the hot spot area can have a certain chance to switch to the second specific beam, thereby reducing the load of the first specific beam and achieving the effect of load balancing.

It will be apparent to those skilled in the art that various modifications and variations can be made to the structure of the disclosed embodiments without departing from the scope or spirit of the disclosure. It is intended that the disclosure cover modifications and variations of this disclosure provided they fall within the scope of the following claims and their equivalents.

What is claimed is:

1. A method for coordinating beam sweeping scheduling, which is adapted to manage an intelligent controller of a plurality of radio units, the method comprising:
   controlling a first radio unit to perform a first beam sweeping operation to provide a plurality of first beams to a plurality of user equipments to connect to the first radio unit;
   determining whether or not a first specific beam corresponding to a hot spot area exists in the plurality of first beams, wherein a plurality of first user equipments of the plurality of user equipments are located in the hot spot area;
   in response to determining that the first specific beam exists in the plurality of first beams, and obtaining, from the plurality of radio units, a beam switching behavior associated with the first specific beam, wherein the first specific beam corresponds to one of a target beam and a source beam in the beam switching behavior;
   obtaining a specific radio unit from the beam switching behavior; and
   controlling the specific radio unit to perform a second beam sweeping operation to provide a plurality of second beams, the plurality of second beams comprising at least one second specific beam directing to the hot spot area, thereby switching at least one of the first user equipments to the at least one second specific beam, wherein a directivity of each of the at least one second specific beam is higher than the directivity of each of the plurality of first beams.

2. The method according to claim 1, wherein the beam switching behavior is a connection switching data between the source beam and the target beam; and the first specific beam corresponds to one of the target beam and the source beam, and the specific radio unit corresponds to another of the target beam and the source beam.

3. The method according to claim 1, wherein determining whether or not the first specific beam corresponding to the hot spot area exists in the first beam comprises:
obtaining a number of connected users of each of the plurality of first beams; and
in response to determining that the number of connected users with one of the plurality of first beams exceeds a predetermined threshold, the one of the plurality of first beams being defined as the first specific beams.

4. The method according to claim 3, wherein the predetermined threshold is based on a total number of the user equipment and a predetermined ratio.

5. The method according to claim 1, wherein after the step of determining that the first specific beam exists in the first beams, the method further comprises:
determining whether or not the first specific beam is overloaded based on a plurality of indicators of connection quality associated with the first specific beam;
in response to determining that the first specific beam is overloaded, obtaining the beam switching behavior associated with the first specific beam from the plurality of radio units; and
in response to determining that the first specific beam is not overloaded, the first specific beam being ignored.

6. The method of claim 5, wherein the plurality of indicators of connection quality comprises at least one of a dropped call rate, a connection establishment number, and a connection success number.

7. The method according to claim 1, wherein the beam sweeping scheduling of the second beam sweeping operation associated with the beam switching behavior is different from the beam sweeping scheduling of the first beam sweeping operation.

8. The method according to claim 1, wherein the intelligent controller controls at least one of the plurality of radio units through at least one of a decentralized unit and a centralized unit, and the intelligent controller communicates with the decentralized unit and the centralized unit through an E2 interface, wherein the plurality of radio units comprise the first radio unit and the specific radio unit.

9. The method according to claim 1, wherein an energy of each of the at least one second specific beam is higher than the energy of the first specific beam.

10. The method according to claim 1, wherein a bandwidth of each of the second specific beams is narrower than a bandwidth of the first specific beam.

11. An intelligent controller, which manages a plurality of radio units, comprising:
a storage circuit, storing a plurality of modules;
a processor, coupled to the storage circuit and accessing the modules to perform the following steps:
controlling a first radio unit to perform a first beam sweeping operation to provide a plurality of first beams to a plurality of user equipments to connect to the first radio unit through one of the plurality of first beams;
determining whether or not a first specific beam corresponding to a hot spot area exists in the first beams, wherein a plurality of first user equipments of the plurality of user equipments are located in the hot spot area;
in response to determining that the first specific beam exists in the plurality of first beams, and obtaining, from the plurality of radio units, a beam switching behavior associated with the first specific beam;
obtaining a specific radio unit from the beam switching behavior; and
controlling the specific radio unit to perform a second beam scanning operation to provide a plurality of second beams, the second beams comprising at least one second specific beam directed to the hot spot area, thereby switching at least one of the first user equipments to the at least one second specific beam, wherein a directivity of each of the at least one second specific beam is higher than the directivity of each of the plurality of first beams.

12. The intelligent controller according to claim 11, wherein the beam switching behavior is a connection switching data between a source beam and a target beam; and the first specific beam corresponds to one of the target beam and the source beam, and the specific radio unit corresponds to another of the target beam and the source beam.

13. The intelligent controller according to claim 11, wherein the processor is configured to:
obtaining a number of connected users of each of the plurality of first beams; and
in response to determining that the number of connected users with one of the plurality of first beams exceeds a predetermined threshold, the one of the first beams being defined as the first specific beams.

14. The intelligent controller according to claim 13, wherein the predetermined threshold is based on a total number of the user equipment and a predetermined ratio.

15. The intelligent controller of claim 11, wherein the processor is further configured to:
determining whether or not the first specific beam is overloaded based on a plurality of indicators of connection quality associated with the first specific beam;
in response to determining that the first specific beam is overloaded, obtaining the beam switching behavior associated with the first specific beam from the plurality of radio units; and
in response to determining that the first specific beam is not overloaded, the first specific beam being ignored.

16. The intelligent controller according to claim 15, wherein the plurality of indicators of connection quality include at least one of a call drop rate, a connection establishment number, and a connection success number.

17. The intelligent controller according to claim 11, wherein the beam sweeping scheduling of the second beam scanning operation associated with the beam switching behavior is different from the beam sweeping scheduling of the first beam sweeping operation.

18. The intelligent controller of claim 11, wherein the intelligent controller controls at least one of the radio units through at least one of a decentralized unit and a centralized unit, and the intelligent controller communicates with the decentralized unit and the centralized unit through an E2 interface, wherein the plurality of radio units comprise the first radio unit and the specific radio unit.

19. The intelligent controller according to claim 11, wherein an energy of each of the at least one second specific beam is higher than the energy of each of the first specific beam.

20. The intelligent controller according to claim 11, wherein a bandwidth of each of the at least one second specific beam is narrower than the bandwidth of the first specific beam.

21. The intelligent controller according to claim 12, wherein the direction of each of the at least one second specific beam corresponds to the another of the target beam and the source beam.

* * * * *